United States Patent [19]
Miyamoto et al.

[11] Patent Number: 5,900,961
[45] Date of Patent: * May 4, 1999

[54] SCANNING OPTICAL DEVICE

[75] Inventors: Hideyuki Miyamoto, Ichikawa; Jun Azuma, Kawasaki, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/500,766

[22] Filed: Aug. 7, 1995

Related U.S. Application Data

[63] Continuation of application No. 08/031,196, Mar. 12, 1993, abandoned.

[30] Foreign Application Priority Data

Mar. 13, 1992 [JP] Japan ................................. 4-089752
Apr. 7, 1992 [JP] Japan ................................. 4-085448

[51] Int. Cl.$^6$ .................................................. G02B 26/08
[52] U.S. Cl. .......................... 359/196; 359/212; 359/216; 347/260
[58] Field of Search .................................... 359/196–226; 250/234–236; 346/108; 464/170, 178; 347/256–263; 358/474, 296, 302

[56] References Cited

U.S. PATENT DOCUMENTS

| | | | |
|---|---|---|---|
| 4,351,005 | 9/1982 | Imai et al. ............................... | 358/300 |
| 5,157,536 | 10/1992 | Uematsu ................................ | 359/217 |
| 5,247,384 | 9/1993 | Inoue et al. ............................ | 359/199 |
| 5,394,173 | 2/1995 | Kubota .................................. | 347/257 |

*Primary Examiner*—James Phan
*Attorney, Agent, or Firm*—Fitzpatrick, Cella, Harper & Scinto

[57] ABSTRACT

Scanning optical device is provided with a light source unit, a deflector for deflecting light beam from the light source, a deflector driving circuit for driving the deflector and an optical housing for accommodating the deflector and the deflector driving circuit. The device is further provided with a cover for closing the optical housing. The cover is provided with an opening through which the deflector driving circuit is exposed to the external air. The hole in the cover is constituted by a tubular partition wall integrally formed with the cover.

34 Claims, 7 Drawing Sheets

SCANNING OPTICAL DEVICE

This application is a continuation of application Ser. No. 08/031,196 filed Mar. 12, 1993, now abandoned.

BACKGROUND OF THE INVENTION

1. Field of the Invention

The present invention relates to a scanning optical device adapted for use in a recording apparatus such as a laser beam printer, and more particularly to a scanning optical device incorporating a rotary polygon mirror and a motor for rotating the same, in an enclosed casing.

2. Related Background Art

In a scanning optical device employed in an image recording apparatus such as a laser beam printer or a laser copying machine, a photosensitive member is scanned with a light beam deflected by a deflecting device to form an electrostatic latent image, which is then rendered visible as a toner image, in a developing device. The toner image is transferred onto a recording sheet, and is fixed thereto by heating in a fixing device to obtain a print.

Figure 1:
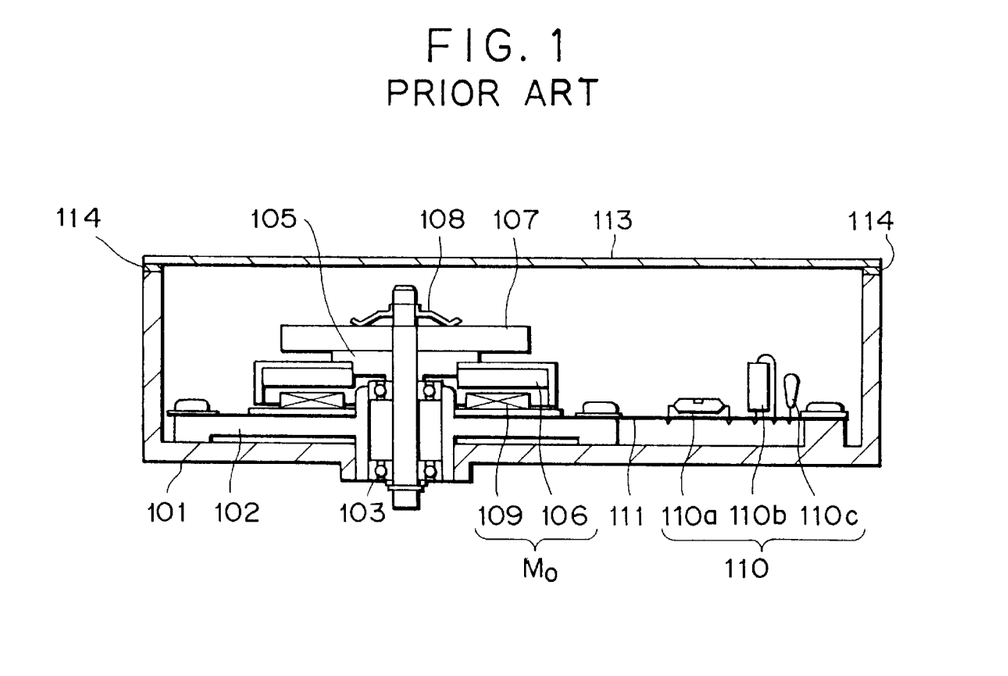
FIG. 1 is a cross-sectional view of a conventional scanning optical device.
Figure 2:
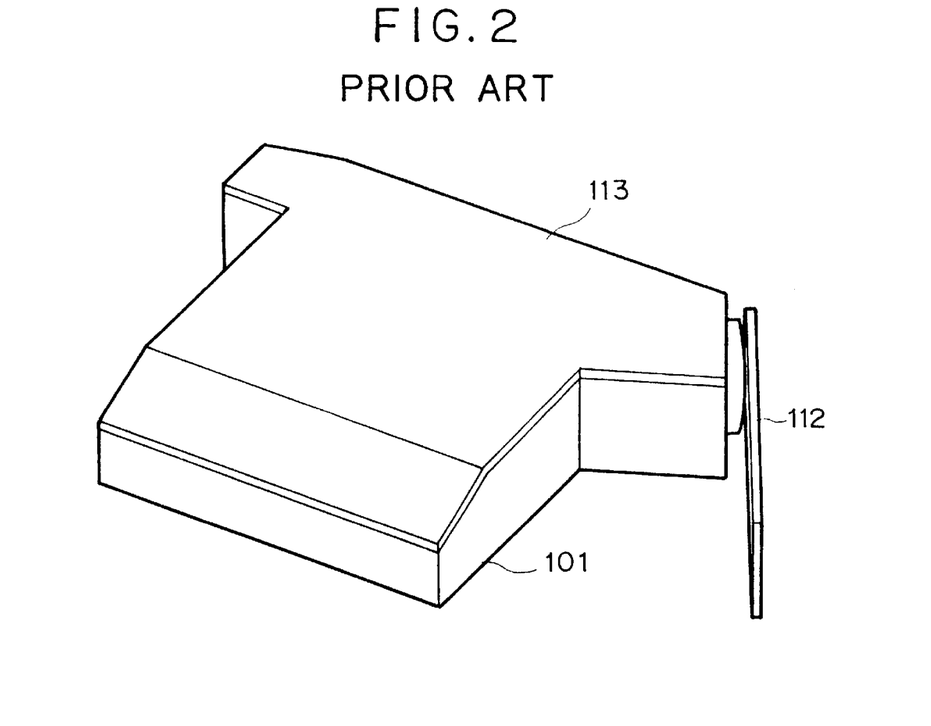
FIG. 2 is an external perspective view of the scanning optical device shown in FIG. 1.

FIG. 1 shows a conventional scanning optical device incorporating a rotary polygon mirror and a motor for driving the same. In an outer casing 101 there is fixed a base plate 102, and a bearing 103 fixed thereon which rotatably supports a shaft 104, which supports a rotor 106 by means of a flange 105. A rotary polygon mirror 107 is urged toward the flange 105 by a press spring 108. The rotor 106 is positioned opposed to a stator 109 fixed to the base plate 102, whereby the rotor 106 and the stator 109 constitute a motor $M^0$. A driving circuit 110 for driving the motor $M_0$ is composed of components 110a–110c mounted on a wiring board 111 extending from under the stator 109 to the side of the base plate 102, and is connected to an unrepresented control circuit which controls the revolution of the motor $M_0$ with a high precision. The rotary polygon mirror 107 rotated by the motor $M_0$ deflects a laser beam emitted from a laser unit 112 shown in FIG. 2, thereby scanning a photosensitive member (not shown). An opening, positioned in the upper part in the illustration, of the outer casing 101 is closed by a lid 113, and the gap between the edges of the lid 113 and the opening of the outer casing is sealed by a gasket 114.

In such conventional device, however, since the sealed outer casing incorporates the motor for driving the rotary polygon mirror and the driving circuit therefor, the internal temperature in the casing is significantly elevated by the heat generation of these components, thus leading to the following drawbacks:

(1) The viscosity of the lubricant of the motor bearing is varied, thus leading to unstable rotation of the shaft. As a result, the shaft generates vibration, which induces significant noises and deterioration in performance;

(2) As the electric characteristics of the driving circuit vary with the temperature, the motor cannot be controlled with a high precision.

SUMMARY OF THE INVENTION

In consideration of the foregoing unresolved drawbacks in the prior art, the object of the present invention is to provide a scanning optical device capable of reducing the temperature elevation in the sealed outer casing and rapidly dissipating the heat generated by the driving circuit.

The above-mentioned object can be attained, according to the present invention, by a scanning optical device provided with an outer casing having a recess for accommodating a driving circuit mounted on a wiring board, a motor driven by the driving circuit and a rotary polygon mirror rotated by the motor, and a cover for closing the recess in the outer casing, wherein the cover is provided with an opening for exposing a surface, bearing the driving circuit, of the wiring board to the external atmosphere.

Since the driving circuit is not accommodated in the recess of the outer casing closed by the cover, the major part of the heat generated by the driving circuit is not dissipated into the recess of the outer casing.

DETAILED DESCRIPTION OF THE PREFERRED EMBODIMENTS

Now the present invention will be clarified in detail by embodiments thereof shown in the attached drawings.

Figure 3:
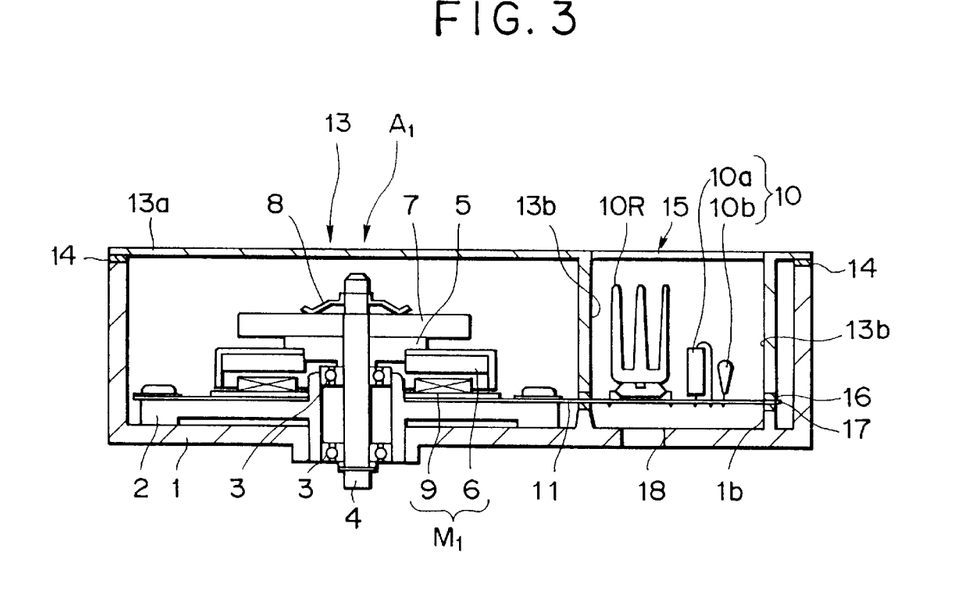
FIG. 3 is a cross-sectional view of a first embodiment of the scanning optical device of the present invention.
Figure 4:
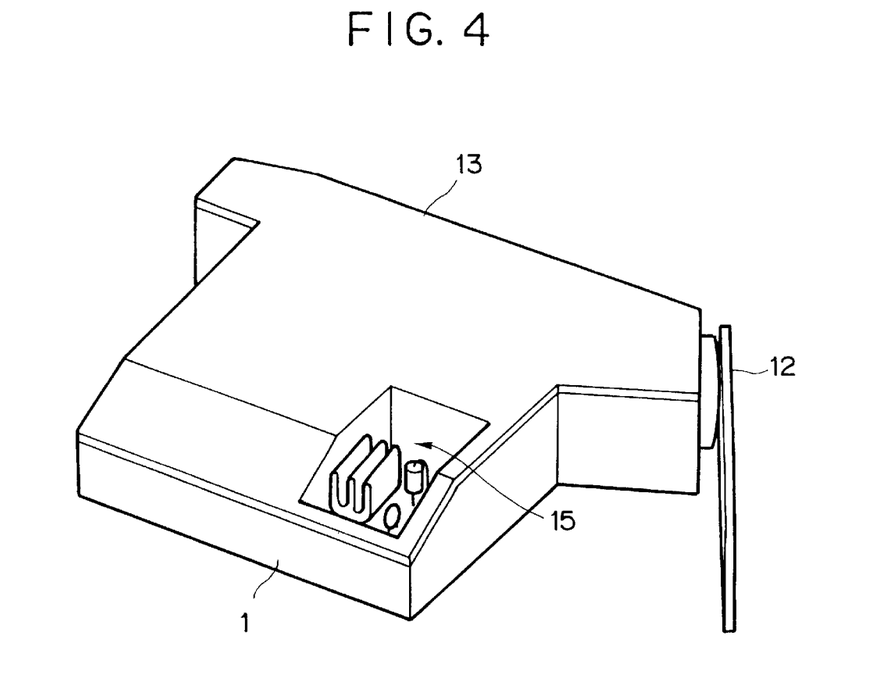
FIG. 4 is an external perspective view of the embodiment shown in FIG. 3.

FIG. 3 is a cross-sectional view showing a first embodiment of the present invention, wherein the scanning optical device $A_1$ of this embodiment is provided with an outer casing (optical casing) 1 of which upper end is open. In the outer casing 1, a base plate 2 is fixed by known means, and a pair of ball bearings 3 fixed to the base plate 2 rotatably support a shaft 4, which supports a rotor 6 by means of a flange 5. A rotary polygon mirror 7 is urged toward the flange 5 by a press spring 8. The rotor 6 is positioned opposed to a stator 9 fixed to the base plate 2, whereby the rotor 6 and stator 9 constitute a motor $M^1$. A driving circuit 10 for driving said motor $M_1$ comprises components 10a, 10b, . . . mounted on a wiring board 11 extending from under the stator 9 to a side of the base plate 2, and is connected to an unrepresented control circuit, which controls the revolution of the motor $M_1$ with a high precision. The rotary polygon mirror 7 rotated by the motor $M_1$ deflects a laser beam emitted from a laser unit 12 shown in FIG. 4, thereby scanning a photosensitive drum constituting an object to be scanned.

Figure 5:
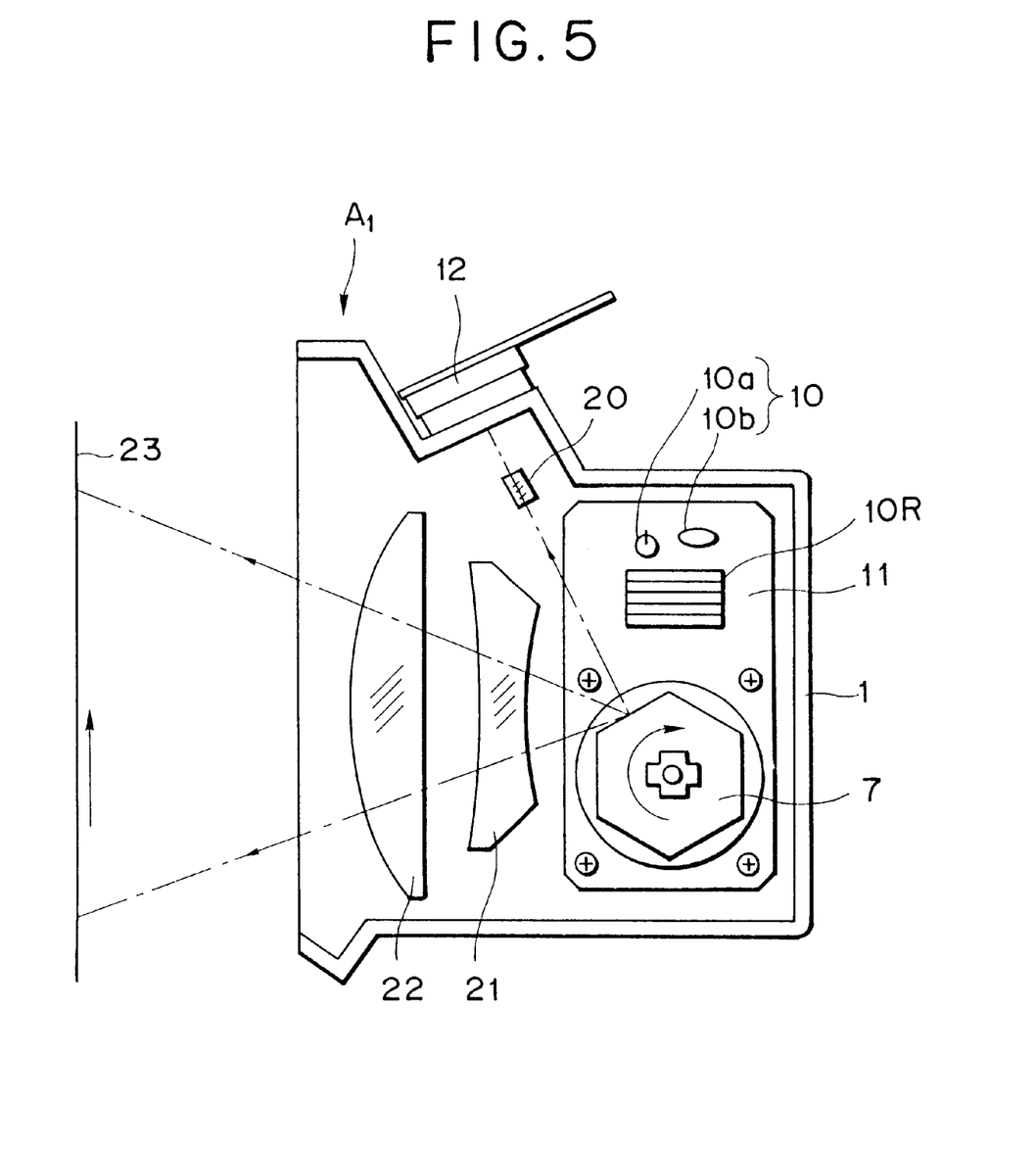
FIG. 5 is a view without the cover, of the embodiment shown in FIG. 3.

FIG. 5 shows the configuration of the scanning optical device $A_1$ in which a cover 13 is detached from the outer casing 1. In FIG. 5, a laser unit 12 comprises, for example, a semiconductor laser for emitting a light beam, a collimating lens for converting the emitted beam into a substantially parallel light beam, and a laser driving circuit for modulating the emitted light beam according to image information.

The light beam emitted from the laser unit 12 passes a cylindrical lens 20, and is deflected by the rotary polygon mirror. 7 for scanning the scanned member with the light beam.

The deflected light beam in scanning motion irradiates the photosensitive drum 23, constituting the recording medium, through a lens system of fθ characteristic, consisting of a concave lens 21 and a convex lens 22.

The upper open end of the outer casing 1 is closed by a cover 13, and the gap between the edges of the cover 13 and of the outer casing engaging therewith is sealed with a gasket 14 thereby preventing the contamination of the rotary polygon mirror by the dusts. The cover 13 is provided with an opening 15 for exposing only a portion, bearing the driving circuit 10, of the wiring board 11. The opening 15 is composed of a substantially tubular partition wall 13b formed integrally with a main body 13a of the cover 13 and having a rectangular cross section. The lower end of the partition wall 13b and the wiring board are mutually sealed by a gasket 16. Also an internal wall of the outer casing 1 is provided integrally with a rib 1b opposed to the partition wall 13b, and the gap between the rib 1b and the wiring board 11 is sealed with a gasket 17.

As explained above, the motor $M^1$ and the rotary polygon mirror 7 are sealed within the outer casing 1 by means of the cover 13 and the gaskets 14, 16, 17, while the driving circuit 10 is exposed to the external atmosphere by the opening 15 of the cover 13. Consequently the major portion of the heat generated by the driving circuit 10 is dissipated into the air, whereby the sealed internal space of the outer casing 1 is protected from significant temperature increase. If necessary, a radiator 10R is provided for accelerating the heat dissipation of the driving circuit 10, and a ventilation hole 18 is provided on the bottom wall of the outer casing 1. The ball bearings 3 may naturally be replaced, for example, by known dynamic pressure fluid bearings. Also the gaskets 14, 16, 17 may be dispensed with if the cover 13 and the outer casing 1 have a high assembling precision, with little air leakage.

In the above-explained first embodiment, the outer casing 1 accommodates the base plate 2 supporting the stator 9 and the ball bearings 3, the rotor 6 supported by the shaft 4 rotatably supported by the ball bearings 3, the rotary polygon mirror 7 pressed to the rotor 6 by means of the press spring 8, and the wiring board 11 connected to the stator 9, and the recessed portion, accommodating these components, of the outer casing 1 is closed by the cover 13. The cover 13 is provided with the opening 15, defined by the tubular partition wall 13b formed integrally with the cover 13, for exposing only the surface, bearing the driving circuit 10, of the wiring board 11, to the exterior.

Thus the scanning optical device of the foregoing embodiment comprises an outer casing having a recess for accommodating a drive circuit mounted on a wiring board, a motor driven by the drive circuit, and a rotary polygon mirror rotated by the motor, and a cover for closing the recess of the outer casing, wherein the cover is provided with an opening for exposing the surface, bearing the drive circuit, of the wiring board to the exterior. The opening is defined by a tubular partition wall formed integrally with the cover.

Figure 6:
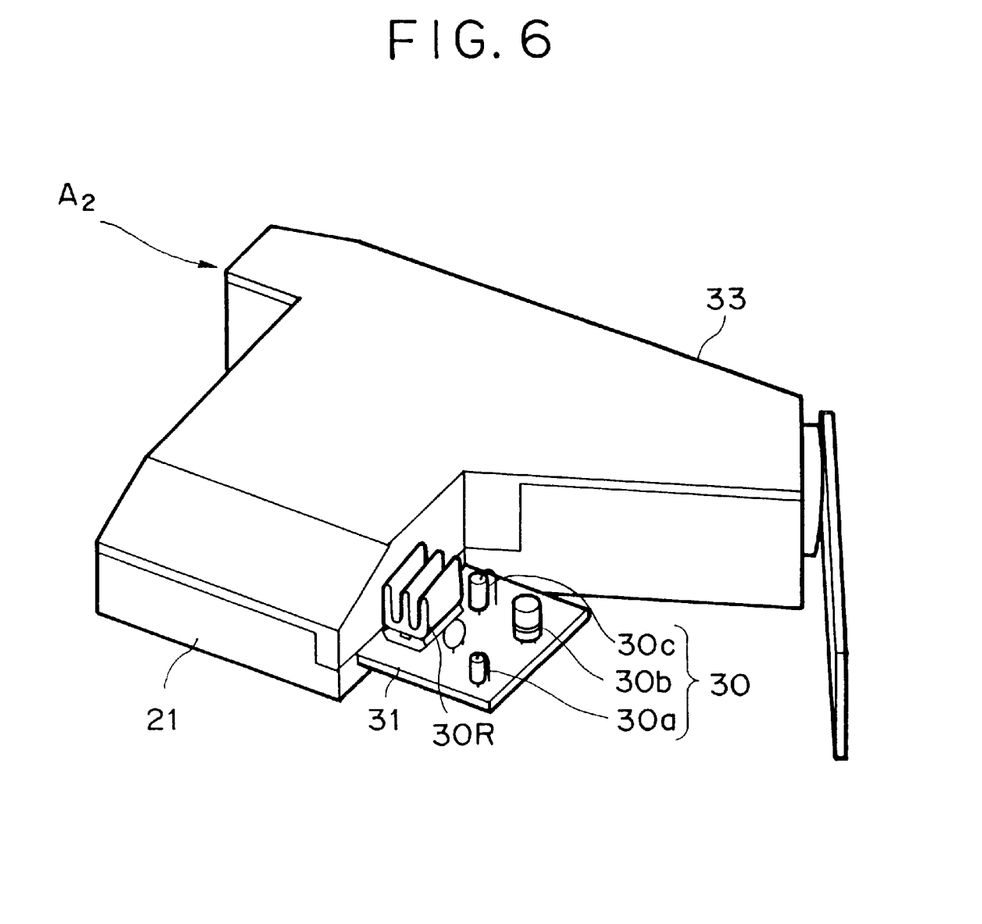
FIG. 6 is a perspective view of a second embodiment of the scanning optical device of the present invention.

FIG. 6 is a perspective view of a second embodiment wherein a portion, bearing a radiator 30R and components 30a–30c of the drive circuit 30, of the wiring board 31 extends outwards from an end face of the outer casing 21, while a portion of the wiring board 31 is accommodated in the casing and is sealed, together with the shaft, rotor, rotary polygon mirror etc. similar to those in the first embodiment, by a cover 33. Other configurations will not be explained as they are similar to those in the first embodiment.

In this second embodiment, the cover 33 is not required to have the opening for exposing the drive circuit 30, and the heat dissipation of the drive circuit 30 is made even smoother, and the flow of the external air around the drive circuit 30 is hindered less.

The scanning optical device of the above-explained embodiment comprises an outer casing having a recess for accommodating a motor driven by a drive circuit mounted on a wiring board, and a rotary polygon mirror rotated by the motor, and a cover for closing the recess of the outer casing, wherein a portion, bearing the drive circuit, of the wiring board protrudes from the outer casing and is exposed in the external atmosphere. The surface, bearing the drive circuit, of the wiring board is provided with a radiator.

The scanning optical device of the present invention, due to the above-explained configuration, provides the following advantages.

As the internal space of the outer casing is protected from the significant temperature increase resulting from the heat generation of the drive circuit, there is prevented the abnormality in rotation, resulting from the change in viscosity of the lubricant in the motor bearings. Also as the drive circuit can dissipate the heat rapidly into the air, there can be prevented the deterioration in performance of the drive circuit, derived from the temperature increase thereof.

In the following still other embodiments of the present invention will be explained, with reference to the attached drawings.

Figure 7A:
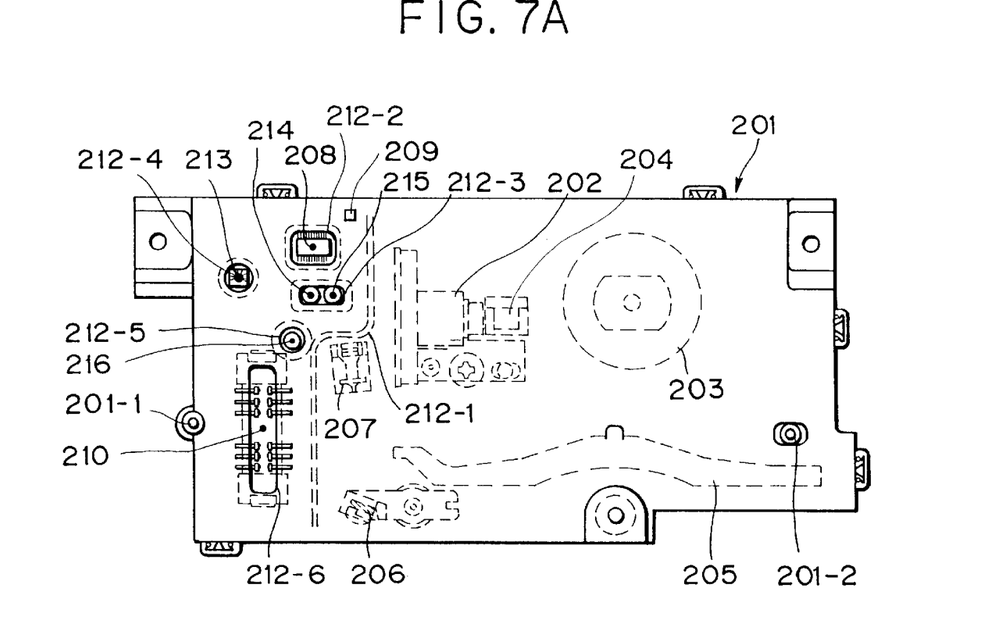
FIGS. 7A and 7B are views of a third embodiment of the scanning optical device of the present invention.
Figure 7B:
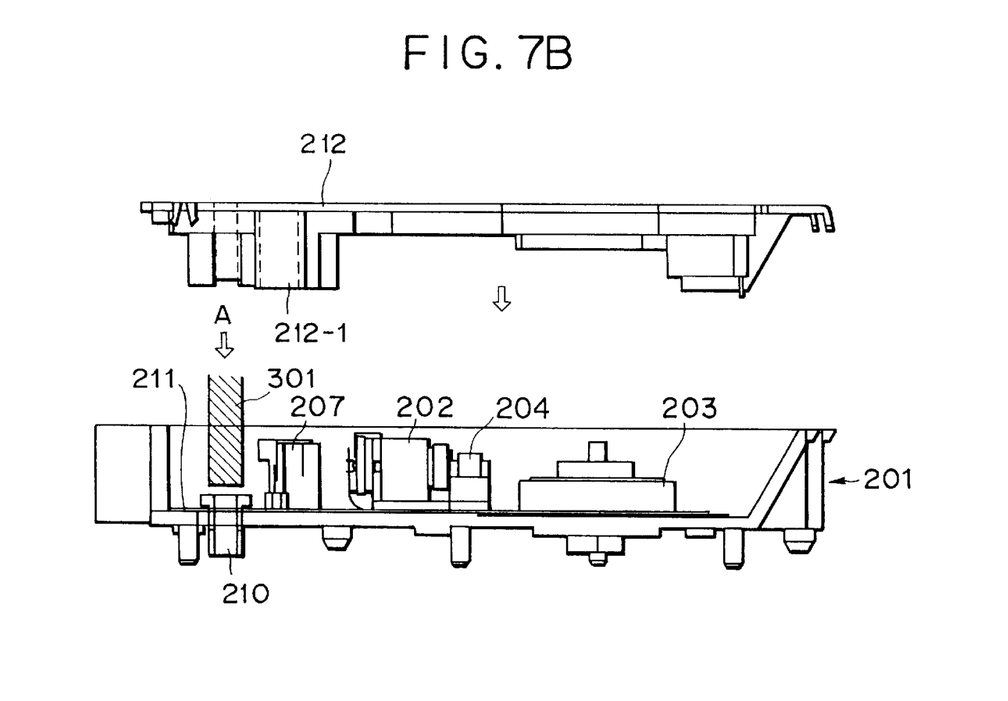

FIGS. 7A to 7B illustrate a third embodiment of the scanning optical device of the present invention, adapted for use in a recording apparatus such as a laser beam printer, wherein an optical housing 201 accommodates following components in unit configurations.

More specifically, there are provided a semiconductor laser unit 202 constituting a light source for emitting a light beam; a motor 203 for rotating a polygon mirror constituting a deflector with two reflecting deflection planes; a cylindrical lens 204 having a refractive power in a direction perpendicular to the plane of drawing; a single fθ lens 205 for converging the light beam, deflectively scanned by the deflector, onto an unrepresented photosensitive member constituting a recording medium; a mirror unit 206 for reflecting the light beam transmitted by said fθ lens; and a horizontal synchronization signal detecting unit 207. The light beam reflected by the mirror unit 206 enters a light-receiving plane of a photosensor of the horizontal synchronization signal detecting unit 207, including for example a photodiode. Thus, when the light-receiving plane is irradiated by the light beam deflectively scanned by the deflector 205, the photosensor generates a signal indicating the scanning position of the light beam.

There are further shown an IC device 208 for controlling the semiconductor laser unit 202, the motor 203 and the horizontal synchronization signal detecting unit 207; electric components 209 such as resistors and capacitors; and a connector 210 connected to a connector of a control circuit (not shown) of the main body of the image recording apparatus.

A cover 212 is provided for covering the components in the scanning optical device. A rib 212-1 integrally formed with the cover which seals the components within the housing together with the housing 201.

Tubular duct holes 212-2, 212-3, 212-4, 212-5, 212-6 are provided in the cover 212. The hole 212-2 is formed around the IC device 208, in order to enable functional checking of the IC device 208 without detachment of the cover 212. Also since the IC device 208 is in contact with the external air, there is obtained the cooling effect thereto, and the reliability at the high-temperature operation is improved.

A variable resistor 213 is provided for regulating the light amount of the semiconductor laser unit 202, and the resistance of the variable resistor 213 is regulated by measuring the voltage between a light amount checking terminal 214 and a ground terminal 215. Also the scanning speed of the motor 203 and the function of the horizontal synchronization signal detecting unit 207 are checked by measuring the voltage between a check pin 216 and the ground terminal 215 by a measuring device such as an oscilloscope, for example.

A tubular hole 212-3 is provided around the light amount checking terminal 214 and the ground terminal 215. A tubular hole 212-4 is provided around the variable resistor 213 for regulating the laser light amount. These holes enable the control of the laser light amount and the checking, without detachment of the cover 212.

Also a hole 212-4 is provided around the check pin 216 for releasing the signal from the horizontal synchronization detecting unit 207, and enables to confirm the signal without detaching the cover 212.

In the present embodiment there have been explained the check terminal and the regulation or adjusting means for the horizontal synchronization signal and the light amount of the laser, but such two means are not limitative.

A hole 212-6 is provided around the connector 210 for connection with the control circuit (not shown) of the main body of the image recording apparatus, and enables the functional check without detaching the cover 212. Also at the assembling of the scanning optical device unit into the main body through the connector 210, such assembling operation is made possible without applying a stress to the circuit board 211, by inserting a pressing member 301 into the hole 212-6 in a direction A, toward the end portion of the connector 210.

Also the positioning of the cover 212 and the housing 201 is achieved by positioning pins 201-1, 201-2 provided on the housing 201.

The above-explained embodiment of the scanning optical device of the present invention comprises a laser light source, deflection means for deflecting the laser beam emitted from the laser light source, and control means provided with electric components for controlling the laser light source and the deflection means, wherein the laser light source, the deflection means and the control beams are accommodated in an optical housing, and the optical housing is provided with a cover, which is provided with a tubular penetrating hole or holes so formed as to surround the electric components of the control means. By means of the tubular hole or holes, the electric components are exposed to the external atmosphere.

Figure 8:
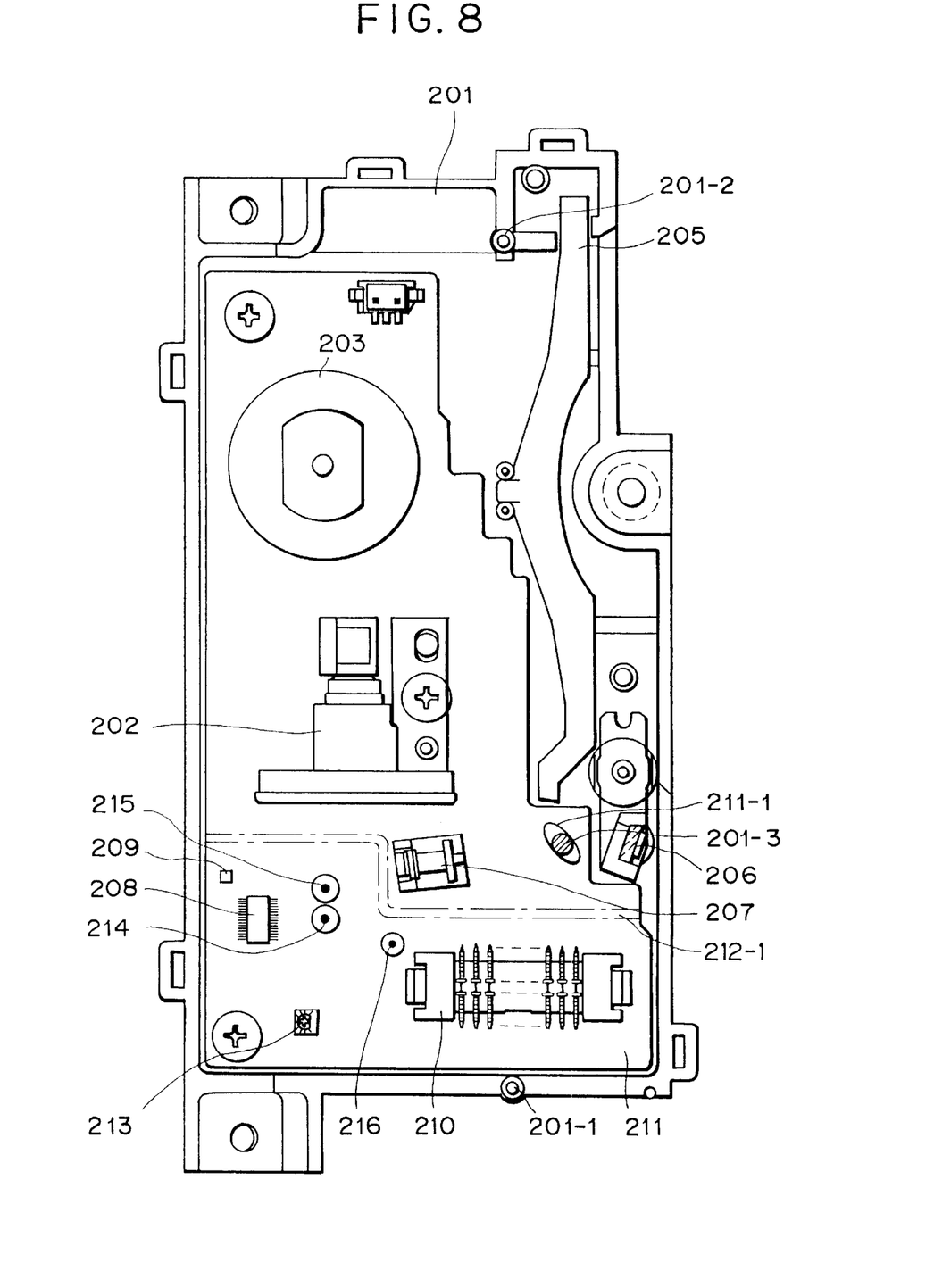
FIG. 8 is a view without the cover, of the third embodiment.

Also as shown in FIG. 8, the IC device 208, the check terminals 214, 215, 216, the variable resistor 213 and the connector 210 are mounted on a same circuit board 211, which is positioned by a hole 211-1 provided therein and a positioning pin 201-3 of the housing 201.

Figure 9:
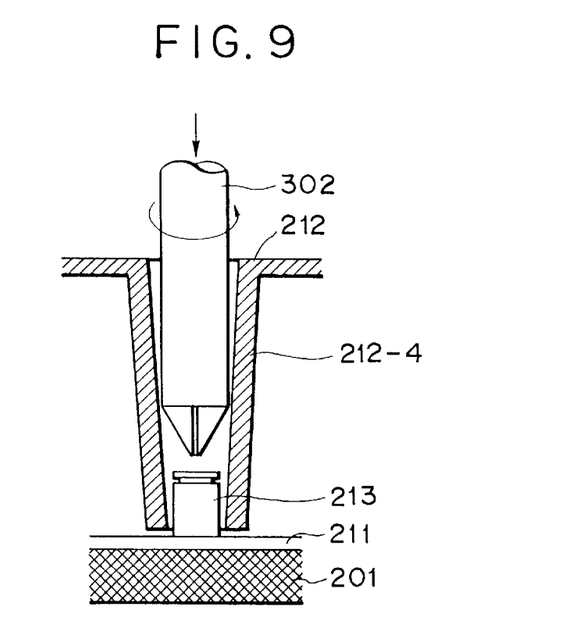
FIG. 9 is a view of a tubular hole in the third embodiment.

FIG. 9 shows the cross-sectional shape of the duct hole 212-4, in which illustrated is a driver tool 302 for rotating the variable resistor 213. A tapered cross-sectional shape of the duct hole 212-4 serves as a guide for inserting the driver tool, thereby facilitating the assembling operation.

In the following there will be explained another embodiment for checking the electric components. The configuration of the device is similar to that of the foregoing embodiment, and the different part alone will be explained in the following, with reference to FIG. 10.

Figure 10:
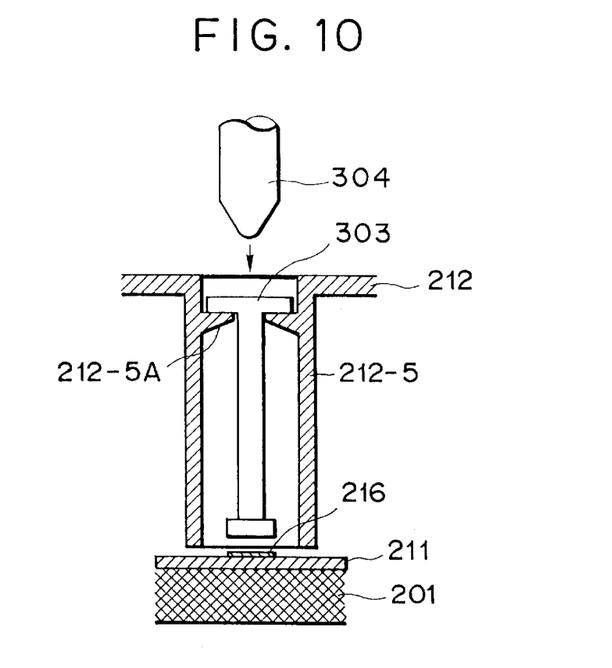
FIG. 10 is another view of the tubular hole.

A conductive pin 303 is biased by a rib 212-5A provided on a hole 212-5 of the cover, and is normally maintained in a non-contact state with a land for voltage checking.

When a probe 304, for example of a tester, presses the pin 303, the rib 212-5A is elastically deformed to bring the pin 303 in contact with the land, thereby enabling measurement.

The device of the present invention of the above-explained configuration and function enables checking and adjustment of the electric components in ordinary atmospheric conditions, thereby improving the efficiency of assembling and servicing. Also since the electric components are in contact with the external air, the temperature increase thereof is suppressed and the reliability is also improved.

What is claimed is:

1. An optical scanning apparatus comprising:

a light source unit;

a deflector for deflecting a light beam emitted from said light source unit;

an optical housing for accommodating said deflector; and board mounted deflector driving circuitry for driving said deflector, wherein at least a portion of said board on which at least some deflector driving circuitry is mounted protrudes from said optical housing.

2. An optical scanning apparatus according to claim 1, wherein said portion of said board is exposed to external air.

3. An optical scanning apparatus according to claim 1, wherein a radiator for accelerating dissipation of heat generated from said deflector driving circuitry is mounted on said portion of said board.

4. An optical scanning apparatus according to claim 1 further comprising a cover for closing said optical housing.

5. A light deflecting apparatus comprising:

a deflector for deflecting a light beam;

an optical housing for accommodating said deflector;

a cover for closing said optical housing; and board mounted deflector driving circuitry for driving said deflector, wherein at least a portion of said board on which at least some deflector driving circuitry is mounted protrudes from said optical housing.

6. A light reflecting apparatus according to claim 5, wherein said portion of said board is exposed to external air.

7. A light deflecting apparatus according to claim 5, wherein a radiator for accelerating dissipation of heat generated from said deflector driving circuitry is mounted on said portion of said board.

8. A recording apparatus comprising:

a light source unit;

a deflector for deflecting a light beam emitted from said light source unit;

a recording medium adapted to receive the light beam deflected by said deflector;

an optical housing for accommodating said deflector;

a cover for closing said optical housing; and board mounted deflector driving circuitry for driving said deflector, wherein at least a portion of said board on which at least some deflector driving circuitry is mounted protrudes externally from said optical housing.

9. A recording apparatus according to claim 8, wherein said portion of said board is exposed to external air.

10. A recording apparatus according to claim 8, wherein a radiator for accelerating dissipation of heat generated from said deflector driving circuitry is mounted on said portion of said board.

11. An optical scanning apparatus comprising:

a light source unit;

a deflector for deflecting a light beam emitted from said light source unit;

an optical housing having a recessed portion for accommodating said deflector; and board mounted deflector driving circuitry for driving said deflector, wherein at least a portion of said board on which at least some deflector driving circuitry is mounted protrudes from said optical housing.

12. An optical scanning apparatus according to claim 11, wherein said portion of said board is exposed to external air.

13. An optical scanning apparatus according to claim 11, wherein a radiator for accelerating dissipation of heat generated from said deflector driving circuitry is mounted on said portion of said board.

14. An optical deflecting apparatus comprising:

a deflector for deflecting a light beam;

an optical housing having a recessed portion for accommodating said deflector; and board mounted deflector driving circuitry for driving said deflector, wherein at least a portion of said board on which at least some deflector driving circuitry is mounted protrudes from said optical housing.

15. An optical deflecting apparatus according to claim 14, wherein said portion of said board is exposed to external air.

16. An optical deflecting apparatus according to claim 14, wherein a radiator for accelerating dissipation of heat generated from said deflector driving circuitry is mounted on said portion of said board.

17. A recording apparatus comprising:

a light source unit;

a deflector for deflecting a light beam emitted from said light source unit;

a recording medium adapted to receive the light beam deflected by said deflector;

an optical housing having a recessed portion for accommodating said deflector; and board mounted deflector driving circuitry for driving said deflector, wherein at least a portion of said board on which at least some deflector driving circuitry is mounted protrudes from said optical housing.

18. A recording apparatus according to claim 17, wherein said portion of said board is exposed to external air.

19. A recording apparatus according to claim 17, wherein a radiator for accelerating dissipation of heat generated from said deflector driving circuitry is mounted on said portion of said board.

20. An optical scanning apparatus comprising:

a light source unit;

a deflector for deflecting a light beam emitted from said light source unit;

an optical housing for accommodating said deflector; and board mounted deflector driving circuitry for driving said deflector, wherein at least a portion of said board on which at least some deflector driving circuitry is mounted exposes to external air outside of said optical housing, and a portion other than said portion of said board on which at least some deflector driving circuitry is mounted is accommodated within said optical housing so as not to expose to external air outside of said optical housing.

21. An optical scanning apparatus according to claim 20, wherein a radiator for accelerating dissipation of heat generated from said deflector driving circuitry is mounted on said portion of said board.

22. An optical scanning apparatus according to claim 20, further comprising a cover for closing said optical housing.

23. A light deflecting apparatus comprising:

a deflector for deflecting a light beam;

an optical housing for accommodating said deflector;

a cover for closing said optical housing; and board mounted deflector driving circuitry for driving said deflector, wherein at least a portion of said board on which at least some deflector driving circuitry is mounted exposes to external air outside of said cover, and a portion other than said portion of said board on which at least some deflector driving circuitry is mounted is accommodated within said cover so as not to expose to external air outside of said cover.

24. A light deflecting apparatus according to claim 23, wherein a radiator for accelerating dissipation of heat generated from said deflector driving circuitry is mounted on said portion of said board.

25. A recording apparatus comprising:

a light source unit;

a deflector for deflecting a light beam emitted from said light source unit;

a recording medium adapted to receive the light beam deflected by said deflector;

an optical housing for accommodating said deflector;

a cover for closing said optical housing; and board mounted deflector driving circuitry for driving said deflector, wherein at least a portion of said board on which at least some deflector driving circuitry is mounted exposes to external air outside of said cover, and a portion other than said portion of said board on which at least some deflector driving circuitry is mounted is accommodated within said cover so as not to expose to external air outside of said cover.

26. A recording apparatus according to claim 25, wherein a radiator for accelerating dissipation of heat generated from said deflector driving circuitry is mounted on said portion of said board.

27. An optical scanning apparatus comprising:

a light source unit;

a deflector for deflecting a light beam emitted from said light source unit;

an optical housing having a recessed portion for accommodating said deflector; and board mounted deflector driving circuitry for driving said deflector, wherein at least a portion of said board on which at least some deflector driving circuitry is mounted exposes to external air outside of said optical housing, and a portion other than said portion of said board on which at least some deflector driving circuitry is mounted is accommodated within said optical housing so as not to expose to external air outside of said optical housing.

28. An optical scanning apparatus according to claim 27, wherein a radiator for accelerating dissipation of heat generated from said deflector driving circuitry is mounted on said portion of said board.

29. An optical deflecting apparatus comprising:

a deflector for deflecting a light beam;

an optical housing having a recessed portion for accommodating said deflector; and board mounted deflector driving circuitry for driving said deflector, wherein at least a portion of said board on which at least some deflector driving circuitry is mounted exposes to external air outside of said optical housing, and a portion other than said portion of said board on which at least some deflector driving circuitry is mounted is accommodated within said optical housing so as not to expose to external air outside of said optical housing.

30. An optical deflecting apparatus according to claim 29, wherein a radiator for accelerating dissipation of heat generated from said deflector driving circuitry is mounted on said portion of said board.

31. A recording apparatus comprising:

a light source unit;

a deflector for deflecting a light beam emitted from said light source unit;

a recording medium adapted to receive the light beam deflected by said deflector;

an optical housing having a recessed portion for accommodating said deflector; and board mounted deflector driving circuitry for driving said deflector, wherein at least a portion of said board on which at least some deflector driving circuitry is mounted exposes to external air outside of said optical housing, and a portion other than said portion of said board on which at least some deflector driving circuitry is mounted is accommodated within said optical housing so as not to expose to external air outside of said optical housing.

32. An recording apparatus according to claim 31, wherein a radiator for accelerating dissipation of heat generated form said deflector driving circuitry is mounted on said portion of said board.

33. A recording apparatus comprising:

a light source unit;

a deflector for deflecting a light beam emitted from said light source unit;

a recording medium adapted to receive the light beam deflected by said deflector;

an optical housing for accommodating said deflector; and board mounted deflector driving circuitry for driving said deflector, wherein at least a portion of said board on which at least some deflector driving circuitry is mounted exposes to external air outside of said optical housing, and a portion other than said portion of said board on which at least some deflector driving circuitry is mounted is accommodated within said optical housing so as not to expose to external air outside of said optical housing.

34. A recording apparatus according to claim 33, wherein a radiator for accelerating a dissipation of heat generated from said deflector driving circuitry is mounted on said portion of said board.

* * * * *

UNITED STATES PATENT AND TRADEMARK OFFICE
CERTIFICATE OF CORRECTION

PATENT NO. : 5,900,961
DATED : May 4, 1999
INVENTOR(S) : Hideyuki Miyamoto et al.

It is certified that error appears in the above-identified patent and that said Letters Patent is hereby corrected as shown below:

COLUMN 1 line 32, "M°" should read --$M_0$--.

COLUMN 2 line 47, "$M^1$" should read --$M_1$--; and
   line 66, "mirror." should read --mirror--.

COLUMN 3 line 19, "$M^1$" should read --$M_1$--.

COLUMN 4 line 59, delete "which".

UNITED STATES PATENT AND TRADEMARK OFFICE
CERTIFICATE OF CORRECTION

PATENT NO.  : 5,900,961

DATED       : May 4, 1999

INVENTOR(S) : Hideyuki Miyamoto et al.

It is certified that error appears in the above-identified patent and that said Letters Patent is hereby corrected as shown below:

COLUMN 5 line 43, "beams" should read --means--.

COLUMN 7 line 53, "board" should begin a new paragraph.

COLUMN 10 line 1, "An" should read --A--; and
   line 3, "form" should read --from--.

Signed and Sealed this

Sixteenth Day of November, 1999

Attest:

Q. TODD DICKINSON

Attesting Officer       Acting Commissioner of Patents and Trademarks